United States Patent

[11] 3,614,610

| | | | | |
|---|---|---|---|---|
| [72] | Inventor | Raymond H. Legatti<br>Moultrie, Ga. |
| [21] | Appl. No. | 839,338 |
| [22] | Filed | July 7, 1969 |
| [45] | Patented | Oct. 19, 1971 |
| [73] | Assignee | Electromagnetic Industries, Inc.<br>Sayville, L.I., N.Y. |

[54] PORTABLE VOLTAGE AND FREQUENCY TESTER
8 Claims, 2 Drawing Figs.

[52] U.S. Cl. ............................................. 324/115,
324/122, 324/133
[51] Int. Cl. ........................................ G01r 15/08,
G01r 19/14
[50] Field of Search ........................................... 324/115,
80, 81, 122, 133, 67

[56] References Cited
UNITED STATES PATENTS

| | | | | |
|---|---|---|---|---|
| 1,779,259 | 10/1930 | Meissner | | 324/80 |
| 2,094,645 | 10/1937 | Foulke | | 324/122 |
| 2,109,189 | 2/1938 | Bly | | 324/67 |
| 3,231,816 | 1/1966 | Oehlerking | | 324/133 |
| 3,281,692 | 10/1966 | Beroset | | 324/133 X |
| 3,304,498 | 2/1967 | Myers | | 324/133 |

*Primary Examiner*—Rudolph V. Rolinec
*Assistant Examiner*—Ernest F. Karlsen
*Attorney*—McGlew and Toren ABSTRACT: A portable voltage and frequency tester includes a pair of probes for connection to a source of potential. A voltage divider and associated neon lamps, lit in cascade, are connected across the probes and indicate AC voltages from 110 to 440 and DC voltages from 110 to 650. A second voltage indicator is connected across the probes and includes an incandescent lamp and an audible signal generator which are energized in alternation to indicate a minimum voltage of 25 volts or more across the probes.

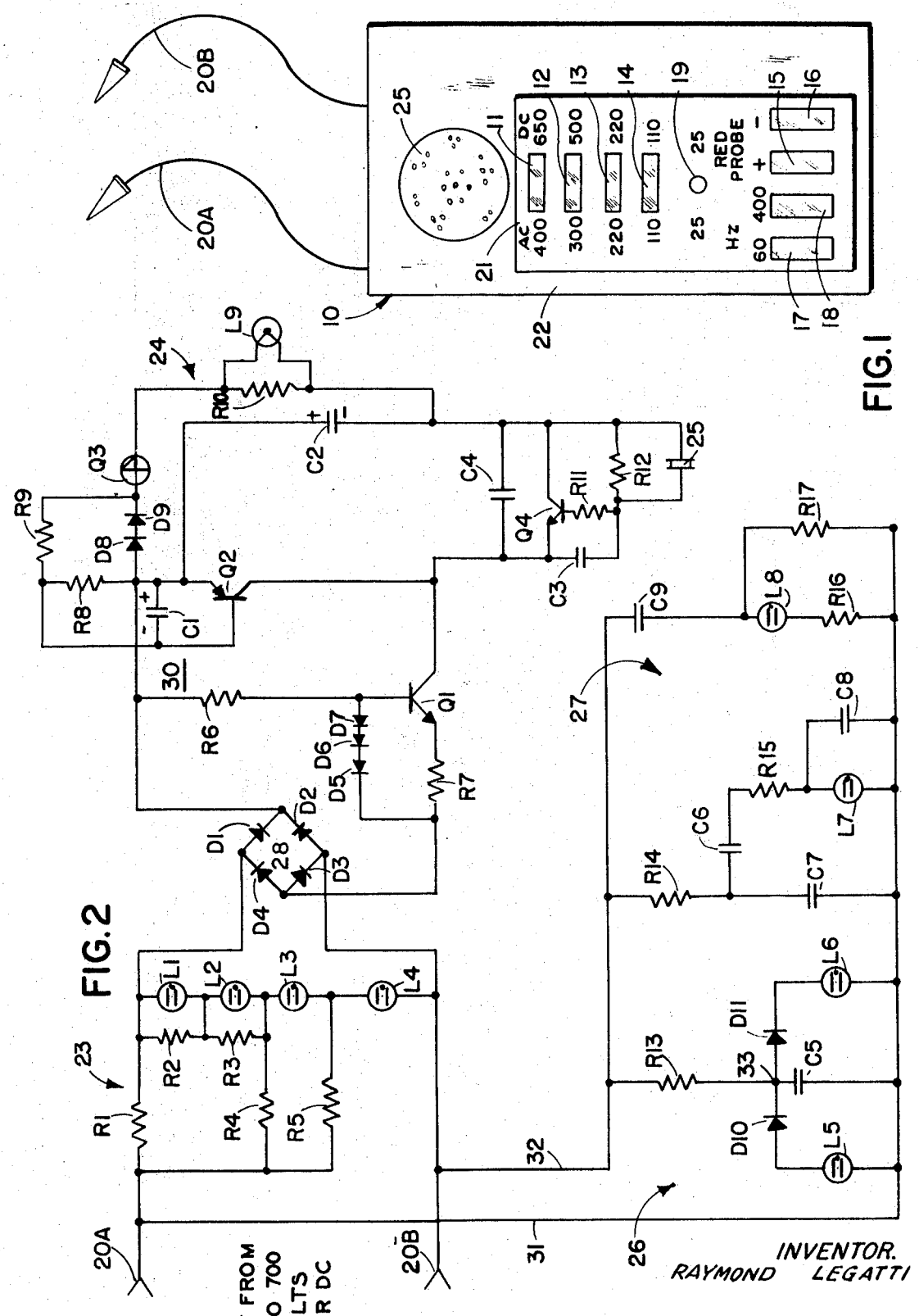

PORTABLE VOLTAGE AND FREQUENCY TESTER

BACKGROUND OF THE INVENTION

In modern electrical and electronic apparatus various voltages, both AC and DC, are used in accordance with the particular requirements of an installation. These voltages may range from the commercial 110-120 volt, 60-cycle, AC voltages to 650 DC voltages, commercial voltages of 220 volts AC and 440 AC being not uncommon. In addition, many components are designed for use with a relatively low voltage, such as 6, 12, or 24 volts DC.

It is important, therefore, to know not only the magnitude of the potential of a source of electrical potential but also whether the potential is AC or DC, whether it is 60-cycle AC or 400-cycle AC, and, in the case of DC voltages, the relative polarity of the terminals of the potential source. While various voltage testers have been proposed, they have been of relatively limited application, most voltage testers being capable of indicating only the potential of AC or DC source. In addition, there has been a longfelt need for a portable or "pocket"-type voltage tester of substantially universal application, at least over the range of voltages most frequently encountered, as well as being able to detect and indicate the most commonly used frequencies.

SUMMARY OF THE INVENTION

This invention relates to a voltage and frequency tester and, more particularly, to an improved, simplified, compact, "pocket" tester able to test both AC and DC voltages as to magnitude, DC voltages as to polarity, AC voltages as to frequency, and further to test or detect relatively small voltages of the order of 25 volts or less.

In accordance with the invention, a "pocket" or portable voltage, frequency and polarity tester includes a pair of input terminals or probes arranged to be connected to a source of potential to be tested. The magnitude of the voltage is detected by a voltage divider, connected across these input terminals, and having associated therewith series connected neon lamps which light in cascade in accordance with the magnitude of voltages ranging from 110 volts AC to 650 DC. By virtue of their inherent characteristics, the neon lamps clamp the voltage across the voltage divider to 300 volts.

Testing of a voltage of the order of 25 volts or more is effected by a second voltage testing circuit which includes a full-wave rectifier connected to the output of the voltage divider and applying a DC potential, through a current limiting circuit, to an oscillator circuit which is operatively associated with a silicon unilateral switch. This unilateral switch is connected in series with an incandescent lamp shunted by a resistor, and the unilateral switch and the lamp are connected in parallel with a condenser which is charged by the oscillator. An audio circuit, producing an audible signal, is also connected to the oscillator and to the lamp circuit. During charging of the condenser, the audio circuit is energized to provide an audible signal responsive to the presence of a voltage of 25 volts or more. Upon discharge of the condenser through the unilateral switch, the audio circuit is deenergized and the incandescent lamp is lit.

The polarity indicating circuit is connected across the input terminals and includes a pair of neon lamps, each associated with a respective diode, and with the diodes being oppositely poled, the neon lamps and their associated diodes being connected in parallel with a condenser which bypasses AC potential with respect to the neon lamps. One or the other of the neon lamps will light, responsive to the presence of a DC voltage at the input terminals, to indicate the respective polarities of the input terminals.

A frequency detecting circuit is connected in parallel with the polarity detecting circuit, and also includes a pair of neon lamps, each associated with a respective network of resistances and substantially purely reactive condensers. The parameters of the networks are so selected that one lamp will be lit if the input voltage is at 60 cycles and the other lamp will be lit if the input voltage is at 400 cycles.

An object of the invention is to provide an improved, simplified and more efficient voltage, frequency and polarity tester.

Another object of the invention is to provide such a tester in the form of a "pocket" or portable tester.

A further object of the invention is to provide such a tester including a first voltage indicating circuit indicating voltages above a predetermined magnitude and a second voltage indicating circuit indicating voltages below the predetermined magnitude.

Another object of the invention is to provide such a tester in which the second voltage indicator provides both an audible and a visual signal, the two signals being energized an alternation.

A further object of the invention is to provide such a tester including means operable to indicate which of two respective frequencies is present at the input terminals of the tester.

Another object of the invention is to provide such a tester in which, when the input terminals have a DC potential applied thereto, the relative polarity of the terminals is indicated.

A further object of the invention is to provide such a tester requiring only a very small driving current and having a low-watt dissipation even at high-voltage input.

For an understanding of the principles of the invention, reference is made to the following description of a typical embodiment thereof as illustrated in the accompanying drawings.

BRIEF DESCRIPTION OF THE DRAWINGS

In the Drawings:

FIG. 1 is a front elevational view of a "pocket" or portable voltage, frequency and polarity tester embodying the invention; and FIG. 2 is a schematic wiring diagram of the tester.

DESCRIPTION OF THE PREFERRED EMBODIMENT

As illustrated in FIG. 1, the tester includes a casing 10 to which are connected a pair of probes 20A and 20B. One of these probes may be colored red, for example, and the other may be colored black or white, again solely by way of example. Casing 10 is provided with an indicating lamp panel 21 in its front wall 22, and a crystal loud speaker 25 is also mounted in front wall 22.

Lamp panel 21 includes a first series of lamp windows 11–14 arranged in a vertical row, and having AC voltages indicated on one side thereof and DC voltages indicated on the other side thereof. As will be explained hereinafter, each of these lamp windows 11–14 covers a respective neon lamp, and these neon lamps are lit in cascade in accordance with the magnitude, above a predetermined value, of the voltage applied to probes 20A and 20B. Thus, lamp window 11, when illuminated indicates either 440-volts AC or 650-volts DC When lamp window 12 is illuminated, with lamp window 11 remaining dark, the voltage indications are 330-volts AC or 500-volts DC. Similarly, when lamp 13 is illuminated, in the absence of illumination of lamps 11 and 12, the voltage indication is 200-volts AC and 220-volts DC. When only lamp 14 is illuminated, the voltage across input terminals or probes 20A and 20B is 110 volts AC or 110-volts DC.

Immediately below the row of lamp windows 11–14, there is a fifth lamp window 15 behind which is an incandescent lamp. Lamp window 15 is illuminated, in alternation with energization of loudspeaker 25, when the voltage applied to probes 20A and 20B is less than 25 volts, for example.

Below lamp window 15 there is a horizontally extending row of lamp windows 16–19, each of which has a respective neon lamp positioned therebehind. Lamp windows 16 and 17 indicate the frequency of a source of voltage tested by probes 20A and 20B. Specifically, lamp window 16, when illuminated, indicates that the frequency is 60 cycles, and lamp window 17, when illuminated, indicates that the frequency 400 cycles. Of course, illumination of either lamp 16 or 17 further indicates that the voltage being tested is an AC voltage.

When the DC voltage is being tested, either one of the two lamps 18 or 19 is illuminated to indicate, first, that the test voltage is a DC voltage and, second, the polarity of one of the probes 20A or 20B, for example, the "red" probe. Thus, with the described arrangement, it is possible to tell immediately whether the voltage being tested is AC or DC, the magnitude of the voltage, the frequency of the voltage if it is an AC voltage and the polarity of one of the two probes a DC voltage being tested.

Referring now to FIG. 2, input terminals or probes 20A and 20B are indicated as connected to a first voltage indicator 23, a second voltage indicator 24, a polarity indicator 26, and a frequency indicator 27. The first voltage indicator 23 indicates AC or DC voltages ranging from 110 volts to 650 volts or greater. For this purpose, a voltage divider is connected across input terminals or probes 20A and 20B, and includes resistors R1-R5. Associated with this voltage divider are neon lamps L1-L4, each disposed behind a respective lamp window 11-14. Neon lamps L1-L4 are connected in series with each other and are lit in cascade. For this purpose, resistor R1 is connected between probe or terminal 20A and one terminal of lamp L1. Resistor R2 is connected in shunt with lamp L1 and, in series with resistor R1, between terminal or probe 20A and a terminal of lamp L2. Resistor R3 is connected in shunt with lamp L2 and in series with resistor R2 and resistor R1 to terminal or probe 20A. Resistor R4 connects one terminal of lamp L3 directly to probe 20A, and resistor R5 connects one terminal of lamp L4 directly to probe or input terminal 20A. The values of the resistors R1-R5 are so selected that, at a voltage of 110-volts AC or DC only lamp L4 is lit. At a voltage of 220-volts AC or DC, both lamps L3 and L4 are lit. At an AC voltage of 330 volts or a DC voltage of 500 volts, lamps L2, L3 and L4 are lit. While, at a voltage of 440-volts AC or 650-volts DC, all four lamps L1-L4 are lit. Due to their inherent characteristics, lamps L1-L4 clamp the voltage divider at a voltage of 300 volts.

A fullwave rectifier 28 is connected to the output of the voltage divider, and through a current limiting circuit including resistors R6 and R7, transistor Q1 and diodes B5, B6 and B7, to an oscillator circuit 30 comprising transistor Q2 and a condenser C1, condenser C1 having the indicated polarity. Oscillator 30 controls operation of a silicon unilateral switch Q3 and, for this purpose, the emitter of transistor Q2 is connected to switch Q3 through diodes D8 and D9. A network including resistors R8 and R9 is provided in association with condenser C1, diodes D8 and D9 and silicon unilateral switch Q3.

The emitter of transistor Q2 is also connected to the positive terminal of a condenser C2. Silicon unilateral switch Q3 is connected to one terminal of an incandescent lamp L9 shunted by a resistance R10, and the other terminal of incandescent lamp L9 is connected to the negative terminal of condenser C2. The lamp L9 provides a visual indication, behind lamp window 19, of voltages below a predetermined magnitude, such as 25 volts. An audible signal of voltages of this magnitude is further provided by the loudspeaker 25, which comprises a piezoceramic disk with an associated energizing circuit. This energizing circuit is connected to the negative terminal of condenser C2 and to the collector of transistor Q2, and includes a transistor Q4, a condenser C3, resistances R11 and R12, and a condenser C4.

Condenser C2 is charged by operation of oscillator 30 and, when this condenser reaches a charge voltage of approximately 8 volts, it discharges through silicon unilateral switch Q3 to energize lamp L9. During charging of condenser C2, silicon unilateral switch Q3 blocks flow of current through lamp L9 until the mentioned charge voltage is reached. At the same time, the driving circuit for crystal loudspeaker 25 is energized so that an audible signal is given. Thus, the audible signal from speaker 25 alternates with the visible signal from incandescent lamp L9, to indicate that the test voltage is 25 volts or less.

A pair of conductors 31 and 32 are connected to probes 20A and 20B, respectively, and serve to apply the test voltage to polarity indicator 26 and frequency indicator 27. Polarity indicator 26 includes a resistor R-13 connected between conductor 32 and a junction point 33, and includes a second condenser C5 connected between junction point 33 and conductor 31. A neon lamp L5 is connected, in series with a diode D10, between conductor 31 and juncture point 33, and a neon lamp L6, in series with a diode D11, is connected between conductor 31 and junction 33, the lamps with their diodes being in parallel with each other and with condenser C5. It will be noted that, with respect to junction point 33, the diodes D10 and D11 are oppositely poled. Condenser C5 serves to bypass an AC voltage with respect to the lamps L5 and L6. Depending upon the relative polarity of the test source of potential connected to probes 20A and 20B, one or the other of lamps L5 and L6 will be lit to indicate the polarity of a selected one of the two probes, such as the "red probe." The lighting of either lamp L5 or L6 will also indicate that the test source of potential is a DC source rather than an AC source. Lamps L5 and L6 are disposed behind lamp windows 15 and 16, respectively, of panel 21.

Frequency detector 27 includes two neon lamps L7 and L8, disposed behind lamp windows 17 and 18 of panel 21. Lamp L7 is illuminated only when a 60-cycle AC potential is applied to the probes 20A and 20B, and lamp L8 is illuminated only when the 400-cycle AC potential is applied to these probes.

Lamp L7, which indicates a 60-cycle AC potential, has operatively associated therewith a two-stage divider network, with one stage comprising resistance R14 and condenser C7, and the other stage comprising resistor R15 and condenser C8. Condenser C6 is connected between resistors R14 and R15, resistance R15 being in series with lamp L7 and condenser C7 being in parallel with lamp L7. The parameters of the resistors R14 and R15 and the condensers C6, C7, and C8 are so selected that lamp L7 will be illuminated responsive to the presence of a 60-cycle AC potential at the probes 20A and 20B. This effect is due partly to the high reactance of condenser C7 at 60 cycles. At 400 cycles, both condenser C7, which is in one stage of the divider, and condenser C8, which is in the other stage of the divider and is in direct shunt with lamp L7, are sufficiently low in reactance that there is insufficient current to illuminate lamp L7.

A capacitor C9 is in series with lamp L8 which is illuminated responsive to the presence of a 400-cycle AC potential at the probes 20A and 20B. Lamp L8 is in series with the resistance R16 and is shunted by a resistor R17. At 60 cycles the reactance of condenser C9 is very high, and this capacitor, in association with the resistor R17, prevents sufficient potential being applied to lamp L8 to illuminate the same. However, condenser C9 has a low reactance at 400 cycles, and then allows sufficient current to flow to illuminate lamp L8. When either one of the lamps L7 of L8 is illuminated, it indicates that the potential applied to the probes 20A and 20B is an AC potential rather than a DC potential.

The selection of the particular capacity values of the condensers in the frequency testing circuit 27 is very important, as these condensers must have very low dissipation and must be essentially purely reactive devices rather than having a reactive-resistive characteristic, due to leakage currents. In other words, the internal leakage currents of the condensers kept extremely small. This particular circuitry of the invention tester must be used in order that the tester can operate over a 7:1 voltage range and, over such a range, selection of the particular constants of the condensers becomes very important form the standpoint of preventing too high a leakage current. It may be mentioned that the driving current input is only 200–400 microampers, as a limiting value, and that the watt dissipation, at a 700-volt input, is only about 2 watts.

What is claimed is:

1. A portable voltage and frequency tester comprising, in combination, a pair of input terminals for connection to a source of electric potential to be tested; first voltage indicating means, including a voltage divider connected across said input terminals and plural neon lamps each connected across predetermined segments of said voltage divider wherein the individual lamps are sequentially lighted as the voltage across the voltage divider increases to provide an indication of voltage across said input terminals when the voltage across the input terminals is above a predetermined magnitude, second voltage indicating means connected directly across said input terminals in parallel with said first voltage indicating means, and including a lamp, an audible signal generator and circuit components interconnecting said lamp and said signal generator independently of the components of said first voltage indicating means, and operable to energize said lamp and said signal generator cyclically in alternation responsive to impression, across said input terminals, of a respective voltage below said predetermined magnitude; said alternately cycled operation of the lamp and audible signal generator being at a rate dependent upon the voltage across said input terminals until said predetermined magnitude is reached; polarity indicating means connected across said input terminals and operable to indicate the polarity thereof when the voltage impressed thereacross is a DC voltage, said polarity indicating means including a pair of oppositely poled polarity indicator s and a first condenser, all connected in parallel with each other, said condenser shunting alternating current form said polarity indicators; and frequency indicating means connected across said input terminals and including plural frequency indicators each operable to indicate only one respective frequency of AC voltages impressed across said input terminals, each frequency indicator including a respective lamp in association with resistive and reactive components, said last-named components having parameters such that the associated lamp is energized responsive to only one respective frequency.

2. A portable voltage frequency tester, as claimed in claim 1, in which said neon lamps of said first voltage indicating means are connected in series with each other, with the common junctions of the adjacent lamps being connected to respective junctions of said voltage divider; said lamps clamping the voltage across the voltage divider to a predetermined value.

3. A portable voltage and frequency tester, as claimed in claim 1, including current limiting means connecting said second voltage indicating means to said input terminals.

4. A portable voltage and frequency tester, as claimed in claim 3, including a full-wave rectifier connecting said current limiting means to said input terminals to apply a DC potential to said second voltage indicating means; said lamp of said second voltage indicating means comprising an incandescent lamp; said circuit components including a transistor oscillator, normally open switch means connecting said oscillator to said incandescent lamp and a second condenser connected to said oscillator in shunt with said normally open switch means and said incandescent lamp; said second condenser being charged by said oscillator and, when the charge thereon attains a predetermined magnitude, activating said switch means to energize said incandescent lamp.

5. A portable voltage and frequency tester, as claimed in claim 4, in which said normally open switch means is a silicon unilateral switch operable to discharge said second condenser responsive to the charge on said second condenser attaining said predetermined magnitude.

6. A portable voltage and frequency tester, as claimed in claim 5, in which a driving circuit for said audible signal generator includes a second transistor oscillator; said driving circuit being connected to said first-mentioned transistor oscillator and to the junction of said second condenser and said incandescent lamp.

7. A portable voltage and frequency tester, as claimed in claim 1, in which each of said polarity indicators includes a second neon lamp and a respective diode connected in series therewith, said diodes being commonly connected to one terminal of said first condenser and the other terminal of said first condenser being connected to the opposite terminals of said second neon lamps; said diodes being reversely poled with respect to said one terminal of said first condenser.

8. A portable voltage and frequency tester, as claimed in claim 1, in which said frequency indicating means includes first and second frequency indicators; the lamp of first frequency indicator being illuminated when a source of 60-cycle AC potential is connected to said input terminals, and the lamp of said second frequency indicator being illuminated when a source of 400-cycle AC potential is connected to said input terminals; a two-stage divider network connected to the lamp of said first frequency indicator and including a first stage comprising a first resistor and a third condenser connected in series between said input terminals and a second stage comprising a fourth condenser and a second resistor connected, in series with the lamp of said first frequency indicator, between one input terminal and the junction of said first resistor and said second condenser; a fifth condenser connected in shunt with the lamp of said first frequency indicator; said third and fifth condensers having a low reactance at 400 cycles and a high reactance at 60 cycles whereby lamp of said first frequency indicator is illuminated only responsive to connection of a source of 60-cycles AC potential to said input terminals; said second frequency indicator including a sixth condenser and a third resistor connected, in series with its respective lamp, across said input terminals, and further including a fourth resistor connected in shunt with its respective lamp; said sixth condenser having a high reactance at 60 cycles and a low reactance at 400 cycles and the parameters of said third and fourth resistors being such that said lamp of said second frequency indicator is illuminated only responsive to connection of a 400-cycle of AC potential to said input terminals.